Patented Feb. 3, 1942

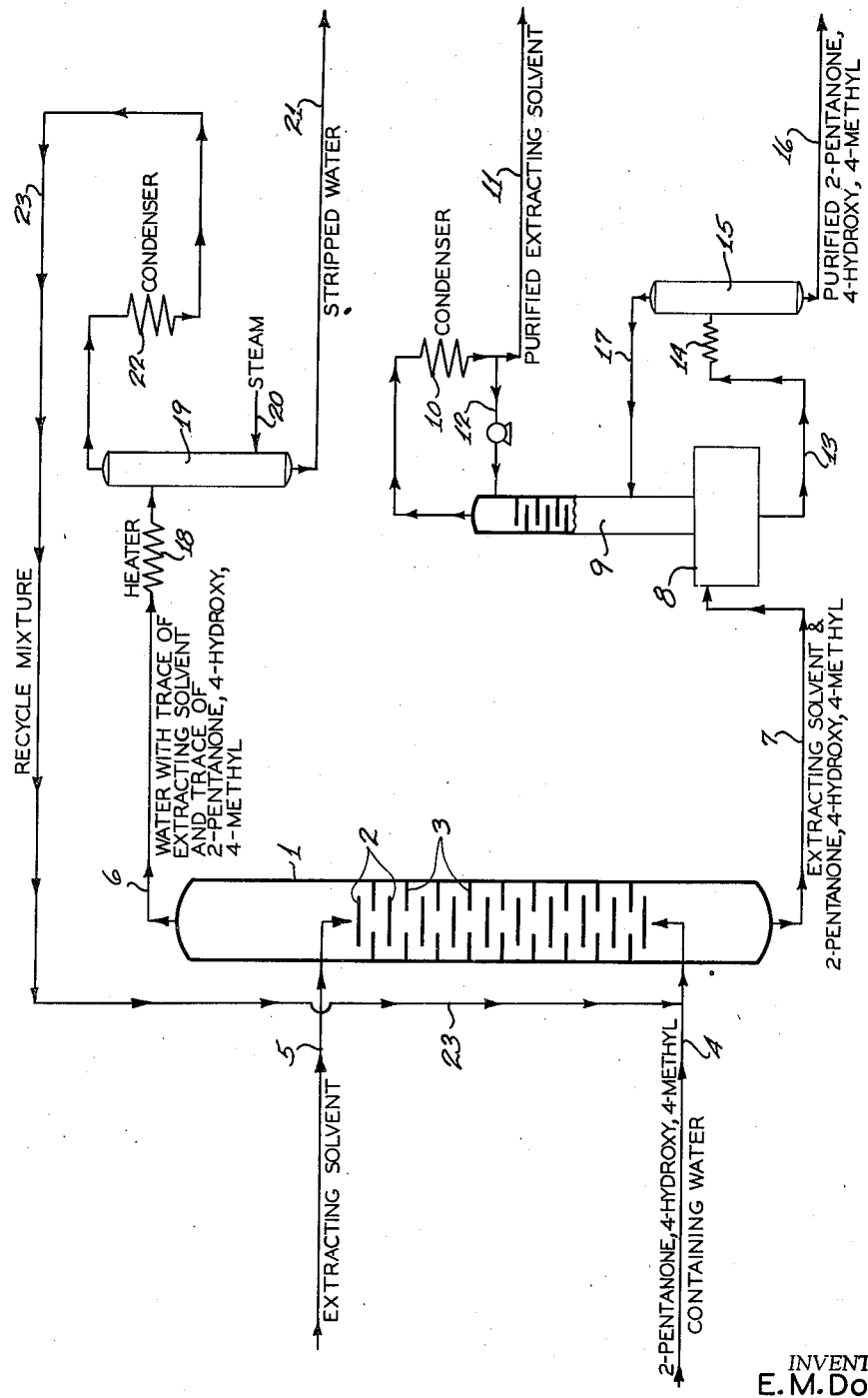

2,271,684

UNITED STATES PATENT OFFICE 2,271,684

PROCESS OF DEHYDRATING 2-PENTANONE, 4-HYDROXY, 4-METHYL

Eddie M. Dons and Oswald G. Mauro, Tulsa, Okla., assignors to Mid-Continent Petroleum Corporation, Tulsa, Okla., a corporation of Delaware Application March 25, 1940, Serial No. 325,814

2 Claims. (Cl. 260—594)

This invention relates to a process of dehydrating 2-pentanone, 4-hydroxy, 4-methyl, the object being to provide for successful commercial use of a selective solvent of this kind in processes of extracting constituents of hydrocarbon oils, and also in other processes wherein the presence of water in the solvent is objectionable. We have found that 2-pentanone, 4-hydroxy, 4-methyl is an excellent selective solvent having high solvent properties for the naphthenic and aromatic compounds of petroleum lubricating oils and a very low solvent property for the paraffinic compounds. However, it is practically impossible to prevent this solvent from accumulating water from various sources, including the charging stock with which it is used, and also from humid atmospheres. An outstanding problem appears in obtaining this solvent in a dehydrated state from a solution of said solvent and water, or from a constant boiling mixture of said solvent and water.

In ordinary distillation, 2-pentanone, 4-hydroxy, 4-methyl normally boils at about 330° F., and since water has a normal boiling point of 212° F., it may appear that the water could be readily distilled from 2-pentanone, 4-hydroxy, 4-methyl. However, we have found that in distilling a solution of this solvent and water, both the solvent and the water will boil simultaneously at a temperature of about 211° F., while producing a distillate consisting of about 74% water and 26% solvent.

To overcome this problem we have developed an extracting process involving the use of a selective solvent which will dissolve the 2-pentanone, 4-hydroxy, 4-methyl, while rejecting the water, the resultant extract solution being preferably heavier than the water, so as to permit the desired separation. In carrying out this dehydrating process, one may employ a continuous countercurrent extracting system, a batch system, or any other suitable method of extracting wherein the dissolved 2-pentanone, 4-hydroxy, 4-methyl is separated from the water. Any suitable selective solvent may be employed to dissolve the 2-pentanone, 4-hydroxy, 4-methyl and separate it from the water, but we have found that methylene dichloride is a desirable and entirely feasible solvent for this purpose. Methylene dichloride has satisfactory selective properties, as well as a desirable specific gravity, and a boiling point of about 100° F., which enables it to be readily distilled from the dehydrated 2-pentanone, 4-hydroxy, 4-methyl. However, instead of employing methylene dichloride, one may obtain more or less satisfactory results by using ethylene dichloride or other solvents or combinations of solvents having the required properties.

With the foregoing and other objects in view, the invention comprises the novel process hereinafter more specifically described and shown in the accompanying drawing. However, it is to be understood that the invention extends to the treatment of equivalents of 2-pentanone, 4-hydroxy, 4-methyl, as well as changes, variations and modifications within the scope of the claims hereunto appended.

The drawing is a diagrammatical view of an extracting system adapted for use in carrying out one form of the invention.

This system comprises an upright column 1 provided with a series of staggered baffles 2 and 3. The incoming charge of 2-pentanone, 4-hydroxy, 4-methyl containing dissolved water is admitted through a pipe 4 and discharged into the column at a point below the baffles. The incoming selective solvent is admitted through a pipe 5 leading to a point above the baffles. In this form of the invention, continuous streams of charging stock and selective solvent are delivered to the extracting column. The charging stock is relatively light, so it rises in a tortuous course between the baffles 2 and 3, while the comparatively heavy selective solvent descends between the baffles. The continuous counterflowing streams are thus forced into intimate contact with each other while flowing in opposite directions between the baffles.

As previously indicated, methylene dichloride is a desirable relatively heavy selective solvent which will dissolve the 2-pentanone, 4-hydroxy, 4-methyl and reject the water. In using this selective solvent, a continuous stream of the water will be discharged through a pipe 6 leading from the top of the column 1, while the extract solution of methylene dichloride and 2-pentanone, 4-hydroxy, 4-methyl is continuously discharged through a pipe 7 leading from the bottom of said column to a still, or evaporator 8, provided with a fractionating column 9. Since methylene dichloride has a low boiling point of about 100° F., while the 2-pentanone, 4-hydroxy, 4-methyl has a higher boiling point of about 330° F., the methylene dichloride can be very readily vaporized at a low temperature of about 130° F. in the still 8. The vapors are conducted from the fractionating column to a condenser 10, where the methylene dichloride is condensed and then transmitted to storage through a pipe 11. If desired, a portion of this cool condensate may be refluxed through a return pipe 12 leading to the upper portion of the fractionating column 9.

The 2-pentanone, 4-hydroxy, 4-methyl appears as residue in the still 8 and may be conducted through a pipe 13 and heater 14 to a separating chamber 15, the purified 2-pentanone, 4-hydroxy, 4-methyl being discharged through a pipe 16 leading from the bottom of said chamber, while any objectionable methylene dichloride is returned through a pipe 17 leading to the fractionating column 9.

The continuous stream of water discharged from the upper portion of the extracting column 1 will carry a trace of the methylene dichloride, or other extracting solvent, and a trace of the 2-pentanone, 4-hydroxy, 4-methyl. This outgoing stream may be conducted through a heater 18 to the upper portion of a stripping column 19, and live steam or other stripping gas may be admitted through a pipe 20 at the lower portion of said stripping column. The stripped water is discharged through a pipe 21 leading from the bottom of the stripping column.

In the stripping column 19, the traces of methylene dichloride and 2-pentanone, 4-hydroxy, 4-methyl will be vaporized and discharged with a very small amount of water vapor or stripping gas. These mixed vapors are conducted to a condenser 22, and the condensate may be returned through a line 23 leading to the incoming continuous stream of 2-pentanone, 4-hydroxy, 4-methyl in the pipe 4.

It will now be observed that the process herein disclosed affords a complete and entirely feasible solution to the problem of removing water from 2-pentanone, 4-hydroxy, 4-methyl, thereby providing for successful commercial use of this material in processes wherein the presence of water is objectionable.

We claim:

1. The process of separating 2-pentanone, 4-hydroxy, 4-methyl from water which comprises mixing the water and 2-pentanone, 4-hydroxy, 4-methyl with methylene dichloride, separating the resultant solution from the water, and distilling the methylene dichloride from the 2-pentanone, 4-hydroxy, 4-methyl.

2. The process of separating 2-pentanone, 4-hydroxy, 4-methyl from water which comprises mixing a continuous stream of the water and 2-pentanone, 4-hydroxy, 4-methyl with a continuous stream of methylene dichloride, causing said continuous streams to flow in opposite directions in contact with each other, so as to extract the 2-pentanone, 4-hydroxy, 4-methyl from the water, separately discharging continuous streams of the water and extract solution, and distilling said extract solution to separate said methylene dichloride from the 2-pentanone, 4-hydroxy, 4-methyl.

EDDIE M. DONS.
OSWALD G. MAURO.